(12) United States Patent
Aggarwala

(10) Patent No.: US 10,830,073 B2
(45) Date of Patent: *Nov. 10, 2020

(54) VANE ASSEMBLY OF A GAS TURBINE ENGINE

(71) Applicant: Raytheon Technologies Corporation, Farmington, CT (US)

(72) Inventor: Andrew S. Aggarwala, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 393 days.

This patent is subject to a terminal disclaimer.

(21) Appl. No.: 16/045,347

(22) Filed: Jul. 25, 2018

(65) Prior Publication Data

US 2019/0048732 A1 Feb. 14, 2019

Related U.S. Application Data

(63) Continuation of application No. 14/938,484, filed on Nov. 11, 2015, now Pat. No. 10,287,901.

(Continued)

(51) Int. Cl.
*F04D 9/04* (2006.01)
*F01D 9/04* (2006.01)
*F01D 5/02* (2006.01)
*F01D 15/12* (2006.01)
*F01D 25/24* (2006.01)
*F01D 5/14* (2006.01)

(52) U.S. Cl.
CPC .............. *F01D 9/041* (2013.01); *F01D 5/02* (2013.01); *F01D 5/143* (2013.01); *F01D 15/12* (2013.01); *F01D 25/24* (2013.01); *F05D 2220/3212* (2013.01); *F05D 2220/3215* (2013.01); *F05D 2220/36* (2013.01); *F05D 2240/12* (2013.01); *F05D 2240/129* (2013.01); *F05D 2240/80* (2013.01); *Y02T 50/60* (2013.01)

(58) Field of Classification Search
CPC ... F01D 5/143; F01D 5/02; F01D 9/02; F01D 9/04; F01D 9/041; F01D 15/12; F01D 25/24; F05D 2220/3212; F05D 2220/3215; F05D 2220/36; F05D 2240/12; F05D 2240/129; F05D 2240/80
See application file for complete search history.

(56) References Cited

U.S. PATENT DOCUMENTS 7,204,676 B2 4/2007 Dutton et al.
8,459,956 B2 6/2013 Pandey et al.
(Continued)

FOREIGN PATENT DOCUMENTS

EP 0937862 8/1999
JP 2005113788 4/2005

*Primary Examiner* — David E Sosnowski
*Assistant Examiner* — Danielle M. Christensen
(74) *Attorney, Agent, or Firm* — Getz Balich LLC

(57) ABSTRACT

A first stage vane array of a high pressure turbine that may be for a geared turbofan engine includes a plurality of airfoils circumferentially spaced from one-another and orientated about an engine axis. Each airfoil has a leading edge and a trailing edge with the trailing edge being circumferentially separated by the next adjacent trailing edge by a pitch distance. The leading a trailing edges of each one of the plurality of airfoils are axially separated by an axial chord length. A pitch-to-chord ratio of the pitch distance over the axial chord length is equal to or greater than 1.7.

12 Claims, 3 Drawing Sheets

Related U.S. Application Data

(60) Provisional application No. 62/089,014, filed on Dec. 8, 2014.

(56) References Cited

U.S. PATENT DOCUMENTS

| | | |
|---|---|---|
| 8,647,067 B2 | 2/2014 | Pandey et al. |
| 8,684,684 B2 | 4/2014 | Clements et al. |
| 8,727,716 B2 | 5/2014 | Clements et al. |
| 8,807,930 B2 | 8/2014 | Green et al. |
| 9,017,036 B2 | 4/2015 | Straccia |
| 9,121,368 B2 | 9/2015 | Gallagher et al. |
| 2001/0036401 A1 | 11/2001 | Harvey et al. |
| 2005/0013692 A1 | 1/2005 | Snook |
| 2011/0058940 A1 | 3/2011 | Stephan et al. |
| 2011/0268578 A1 | 11/2011 | Praisner et al. |
| 2012/0156047 A1 | 6/2012 | Huebner |
| 2012/0201688 A1 | 8/2012 | Mahle et al. |
| 2013/0224027 A1 | 8/2013 | Barr et al. |
| 2013/0251520 A1 | 9/2013 | Barr et al. |
| 2014/0140822 A1 | 5/2014 | Capozzi et al. |
| 2015/0315916 A1 | 11/2015 | Xu |
| 2015/0322563 A1 | 11/2015 | Snyder |

VANE ASSEMBLY OF A GAS TURBINE ENGINE

This application is a continuation of U.S. patent application Ser. No. 14/938,484 filed Nov. 11, 2015, which claims priority to U.S. Patent Appln. No. 62/089,014 filed Dec. 8, 2014, which are hereby incorporated by reference.

BACKGROUND

The present disclosure relates to a gas turbine engine, and more particularly, to a first stage vane assembly of a high pressure turbine of the engine.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

The turbine section typically includes alternating rows of turbine vanes and turbine blades. The turbine vanes are stationary and function to direct the hot combustion gases that exit the combustor section. The vanes and blades each project from respective platforms that when assembled form vane and blade rings. Airfoils of the vane and blade rings are designed with pitch-to-chord ratios that are generally dependent on a wide variety of engine characteristics and operating parameters. Achieving the optimal pitch-to-chord ratio is desirable to optimize engine efficiency and performance. Moreover, achieving higher pitch-to-chord ratios may reduce the number of required airfoils and/or reduce cooling requirements thereby improving engine efficiency and reducing engine manufacturing and maintenance costs.

SUMMARY

A first stage vane assembly of a high pressure turbine of a gas turbine engine according to one, non-limiting, embodiment of the present disclosure includes a first airfoil configured to be circumferentially spaced from an adjacent second airfoil and orientated about an engine axis, wherein the first airfoil has a leading edge and a trailing edge with the trailing edge configured to be circumferentially separated from the trailing edge of the second airfoil by a pitch distance, and the leading and trailing edges of the first airfoil are axially separated by an axial chord length, and wherein a pitch-to-chord ratio of pitch distance over axial chord length is equal to or greater than 1.7.

Additionally to the foregoing embodiment, the first airfoil has a thickness-to-axial chord ratio that is greater than forty percent.

In the alternative or additionally thereto, in the foregoing embodiment, the thickness-to-axial chord ratio is about fifty-three percent.

In the alternative or additionally thereto, in the foregoing embodiment, the trailing edge has an angle that is greater than seventy-five degrees.

In the alternative or additionally thereto, in the foregoing embodiment, the pitch-to-chord ratio is within a range of about 1.7 to 2.0.

In the alternative or additionally thereto, in the foregoing embodiment, the pitch-to-chord ratio is about 1.8.

In the alternative or additionally thereto, in the foregoing embodiment, the assembly includes an inner endwall, wherein the first airfoil projects radially outward from an outward surface of the inner endwall and the outward surface includes at least in-part a concave region located axially between the leading and trailing edges and circumferentially adjacent to the first airfoil.

In the alternative or additionally thereto, in the foregoing embodiment, the outward surface includes a convex region proximate to the leading edge of the first airfoil.

In the alternative or additionally thereto, in the foregoing embodiment, the assembly includes an outer endwall, wherein the first airfoil projects radially inward from an inward surface of the outer endwall and the inward surface includes at least in-part a concave region located axially between the leading and trailing edges and circumferentially adjacent to the first airfoil.

In the alternative or additionally thereto, in the foregoing embodiment, the inward surface includes a convex region proximate to the leading edge of the first airfoil.

A first stage of a high pressure turbine of a gas turbine engine according to another, non-limiting, embodiment includes a vane array having a plurality of airfoils circumferentially spaced from one-another and orientated about an engine axis, wherein each one of the plurality of airfoils have a leading edge and a trailing edge with each one of the trailing edges being circumferentially separated by the next adjacent trailing edge by a pitch distance, and the leading and trailing edges of each one of the plurality of airfoils are axially separated by an axial chord length, and wherein a pitch-to-chord ratio of pitch distance over axial chord length is equal to or greater than 1.7.

A turbofan engine according to another, non-limiting, embodiment includes a fan configured for rotation about an engine axis; a low pressure compressor; a low pressure turbine; a low spool mounted for rotation about the engine axis and interconnecting the low pressure compressor and the low pressure turbine; a high pressure compressor; a high pressure turbine including a first stage vane array having a plurality of airfoils spaced circumferentially from one-another and having a pitch-to-chord ratio greater than 1.7; and a high spool mounted for rotation about the engine axis and interconnecting the high pressure compressor and the high pressure turbine.

Additionally to the foregoing embodiment, the pitch-to-chord ratio is within a range of about 1.7 to 2.0.

In the alternative or additionally thereto, in the foregoing embodiment, the turbofan engine includes a geared architecture configured between the fan and the low spool.

In the alternative or additionally thereto, in the foregoing embodiment, the first stage vane array includes an annular inner endwall having an outward surface generally facing radially outward and having a plurality of concave regions with each one of the plurality of concave regions located between respective adjacent airfoils of the plurality of airfoils that extend radially outward from the outward surface.

In the alternative or additionally thereto, in the foregoing embodiment, the outward surface includes a plurality of convex regions with each one of the plurality of convex regions proximate to a respective leading edge of the plurality of airfoils.

In the alternative or additionally thereto, in the foregoing embodiment, the first stage vane array includes an annular outer endwall having an inward surface generally facing radially inward and having a plurality of concave regions with each one of the plurality of concave regions located between respective adjacent airfoils of the plurality of airfoils that extend radially inward from the inward surface.

In the alternative or additionally thereto, in the foregoing embodiment, the inward surface includes a plurality of convex regions with each one of the plurality of convex regions proximate to a respective leading edge of the plurality of airfoils.

In the alternative or additionally thereto, in the foregoing embodiment, each airfoil of the plurality of airfoils have a thickness-to-axial chord ratio that is greater than forty percent.

The foregoing features and elements may be combined in various combinations without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
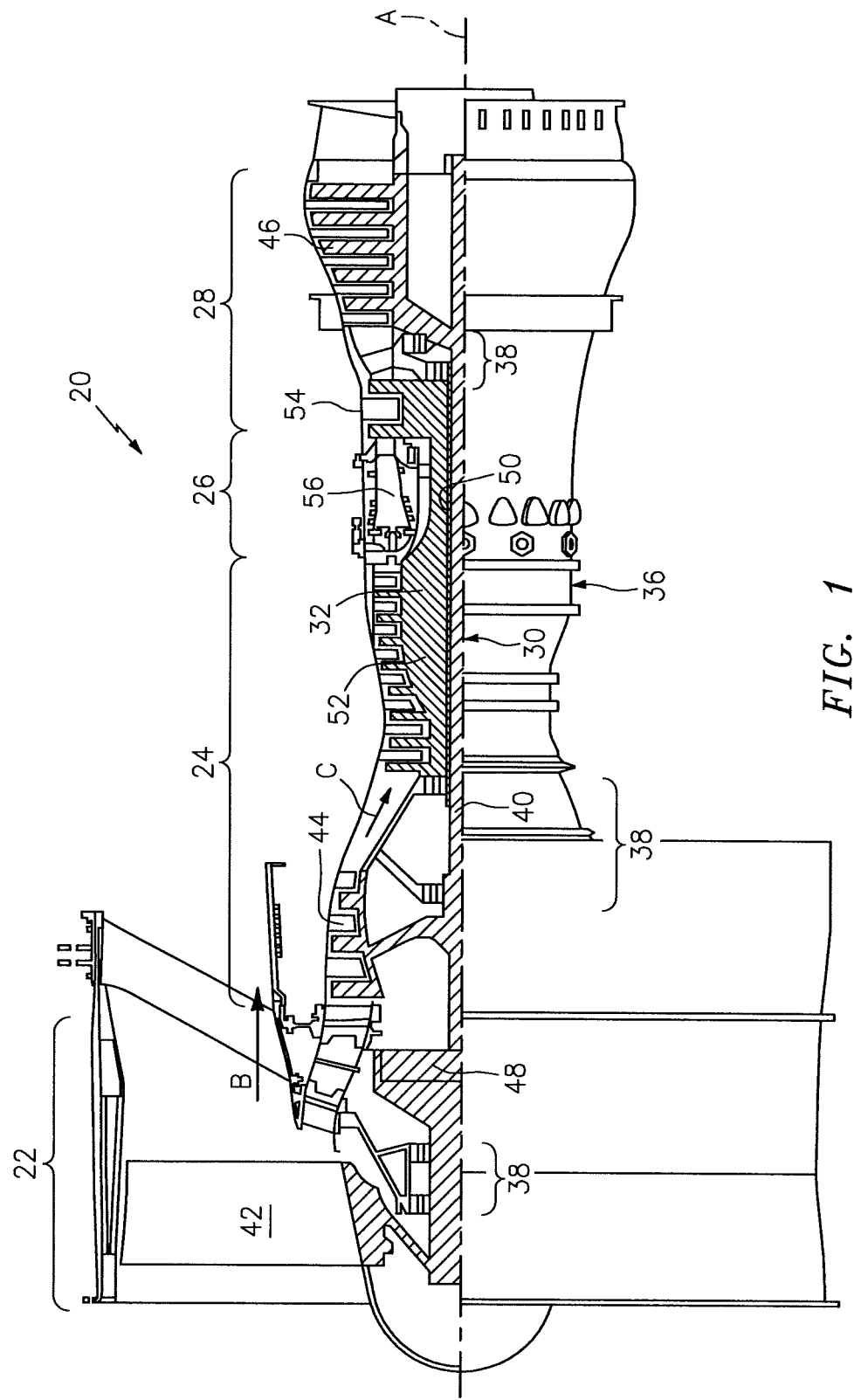
FIG. 1 is a schematic cross section of an exemplary gas turbine engine.

FIG. 1 schematically illustrates a gas turbine engine 20 disclosed as a two-spool, geared, turbofan engine that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26, then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool (plus fan) turbofans with an intermediate spool.

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the ITT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,688 meters). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $(T/518.7)^{0.5}$, where "T" represents the ambient temperature in degrees Rankine. The Low Corrected Fan Tip Speed according to one non-limiting embodiment of the example gas turbine engine 20 is less than about 1150 feet per second (351 meters per second).

Figure 2:
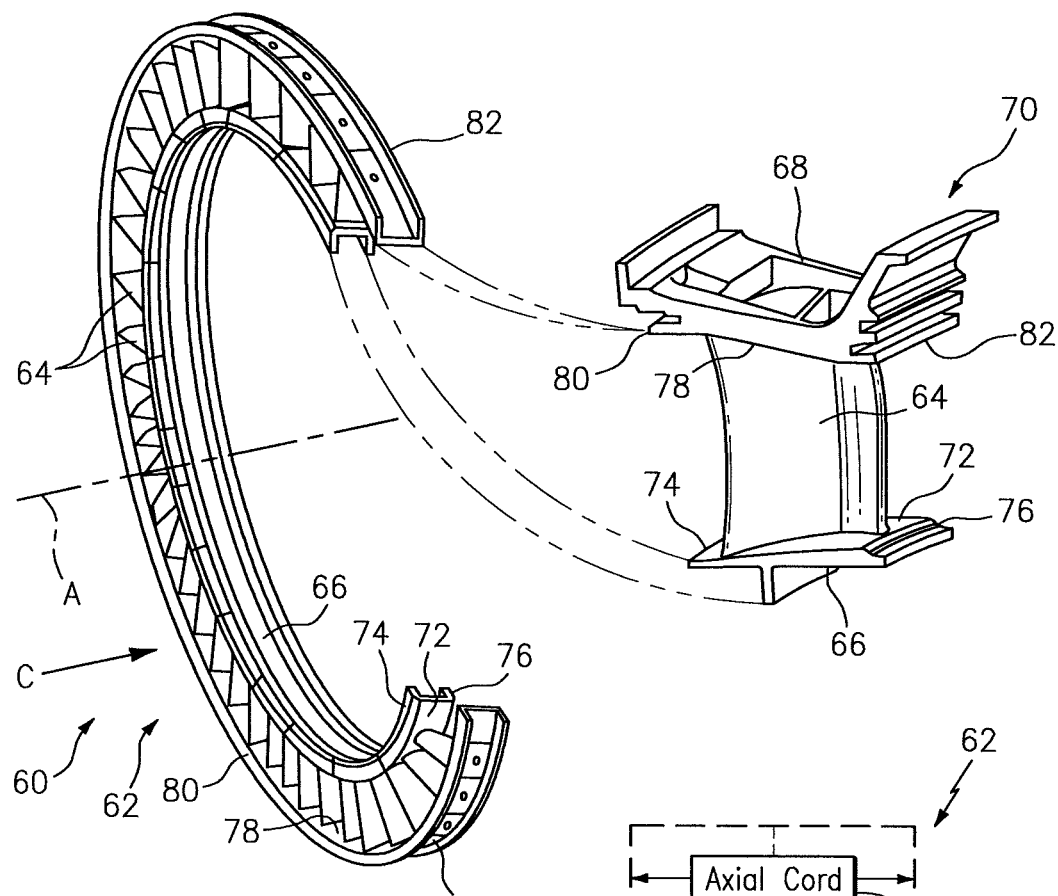
FIG. 2 is an exploded perspective view of a vane array of a first stage of a high pressure turbine of the gas turbine engine.

Referring to FIG. 2, a single turbine airfoil stage 60 of multiple stages of the HPT 54 is illustrated. The airfoil stage 60 may be a first stage (i.e. leading upstream stage) of the HPT 54 and includes a leading or upstream, static, vane array 62 and an axially adjacent and downstream, rotating, blade array (not shown). The vane array 62 has a plurality of circumferentially spaced airfoils 64 (with respect to engine axis A) each extending radially between, ring-shaped, inner and outer endwalls 66, 68 (i.e. platforms). Each vane array 62 may be circumferentially divided into a plurality of vane assemblies 70 each having at least one airfoil 64 and a portion of the inner and outer endwalls 66, 68. When assembled, the vane assemblies 70 forms the annular shape of the vane array 62 concentrically located about the engine axis A.

Figure 3:
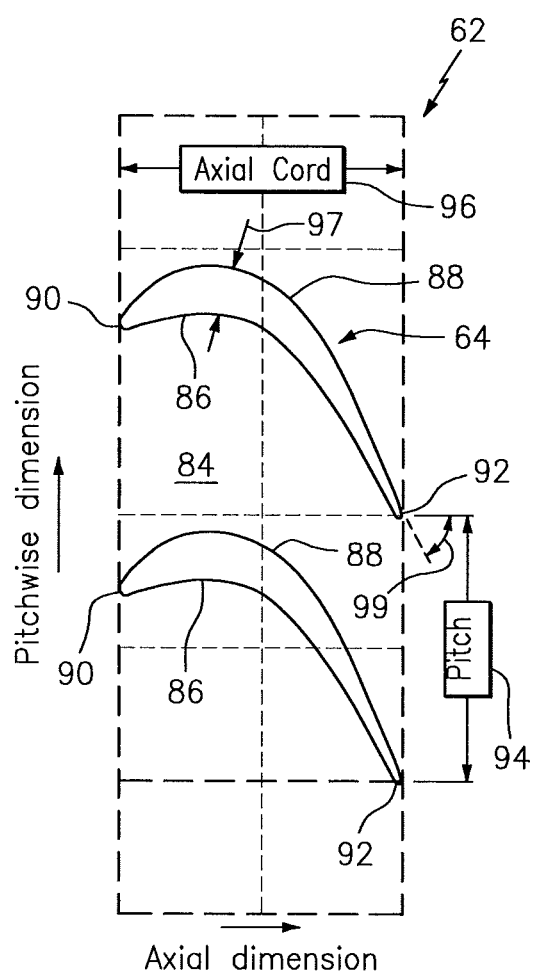
FIG. 3 is a schematic of adjacent airfoils of the vane array illustrating pitch and chord length relationships.

Referring to FIGS. 2 and 3, the inner endwall 66 has a radially outward facing surface 72 that spans axially between fore and aft rims 74, 76 of the inner endwall. Similarly, the outer endwall 68 has a radially inward facing surface 78 that spans axially between fore and aft rims 80, 82 of the outer endwall. The outward surface 72 and the inward surface 78 oppose one another and define, in-part, a hot gas flowpath 84 radially therebetween for the core airflow C.

Each airfoil 64 of the vane array 62 generally extends through the flowpath 84 to redirect the airflow C that, in-turn is received by the downstream blade array for converting airflow energy into work generally represented by rotation of the high spool 32. Each airfoil 64 has a concave pressure side 86 and an opposite convex suction side 88. The sides 86, 88 span between and generally meet at leading and trailing edges 90, 92 of the airfoil 64.

Each airfoil 64 is circumferentially spaced from the next adjacent airfoil by a pitch distance (see arrow 94) and extends axially by an axial chord length (see arrow 96). A pitch-to-chord ratio of the first stage vane array 62 (i.e. all vanes of one array) is equal to or greater than 1.7, may generally be within a pitch-to-chord ratio range of about 1.7 to 2.0, and is preferably about 1.8. With increasing pitch-to-chord ratios, flowpath blockage generally decreases. This decrease may be particularly advantageous for the operating parameters of geared turbofan engines as described above. In more traditional or conventional first stage vane arrays, pitch-to-chord ratios are lower than 1.7 and may generally be within a range of 1.20 to 1.68.

The increased pitch-to-chord ratio of the present disclosure, reduces the number of required airfoils in an array, thus reducing the required cooling needs of the HPT 54, which may increase engine operating efficiency. Furthermore, a decrease in the number of airfoils when compared to more traditional engines reduces maintenance cost and weight. Alternatively or in addition, the increased pitch-to chord ratio may generally represent a decrease in chord length 96, which enables designing an HPT with a reduced axial length thereby improving packaging of the entire engine.

Referring to FIG. 3 and as part of a first stage 60 of the HPT 54, each airfoil 64 of the vane array 62 may have a thickness-to-axial chord ratio that is greater than forty percent (40%) and may be about fifty-three percent (53%). The "thickness" (see arrow 97) is generally the maximum thickness of the airfoil, and may be measured generally at about mid-chord (and/or slightly toward the leading edge 90) of the airfoil 64 and between the sides 86, 88. The "axial chord" is the axial chord length 96 previously described. A higher thickness-to-axial chord ratio drives higher Mach numbers and higher losses; however, the higher pitch-to-chord ratio serves to counteract this undesirable effect.

A trailing edge angle (see arrow 99) measured at the trailing edge 92 of the airfoil 64 may be greater than about seventy-five (75) degrees. Angle 99 (i.e. trailing edge metal angle) is generally measured between an extrapolated line extended from the trailing edge direction and an axial line generally parallel to the engine axis A. The trailing edge metal angles of later or aft stages of the HPT 54 are typically less than seventy-five (75) degrees.

Figure 4:
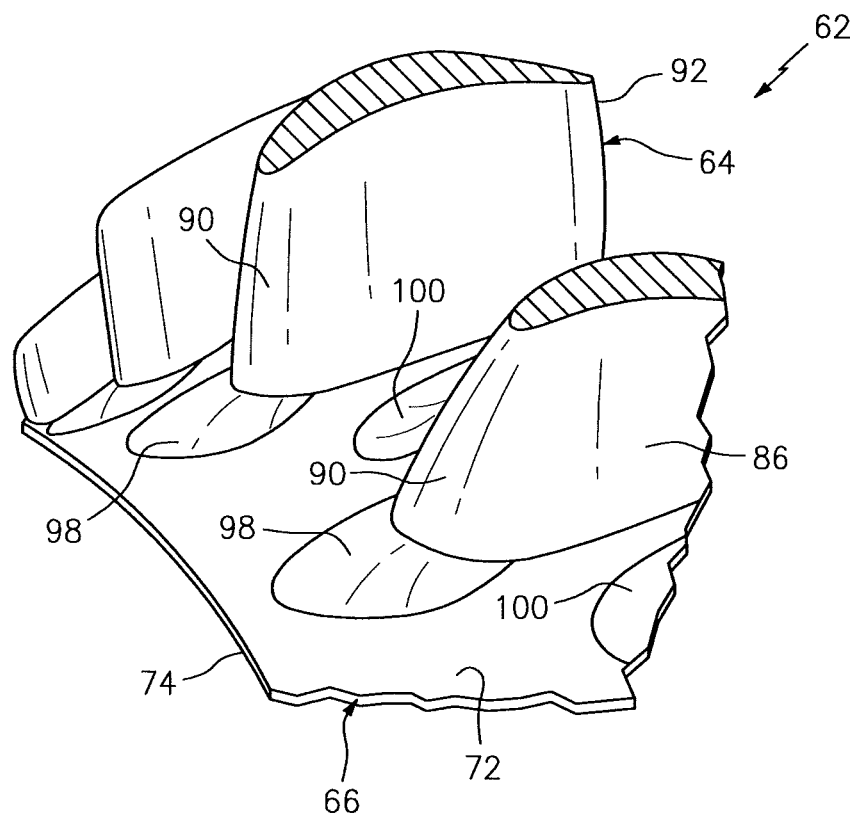
FIG. 4 is a partial perspective view of the vane array.
Figure 5:
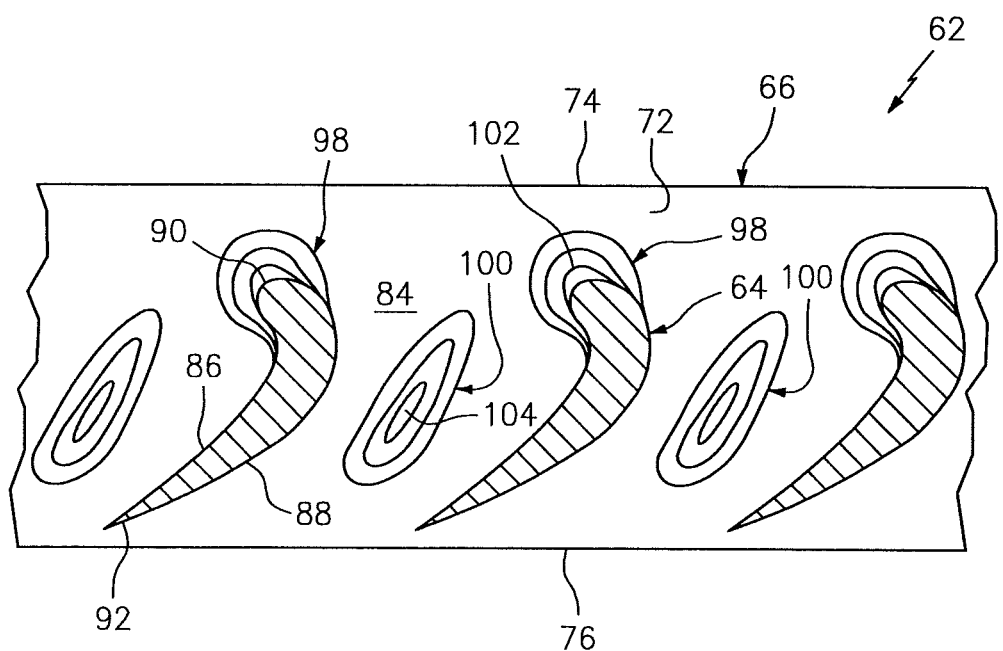
FIG. 5 is a partial plan view of an inner endwall of the vane array.

Referring to FIGS. 3 through 5, higher pitch-to-chord ratios may, in some instances, cause an increase in the formation of air vortices within the airflow C and proximate to the endwalls 66, 68. Such vortices may disrupt core airflow C causing a decrease in engine efficiency. In such isolated examples, one or both of the outward and inward surfaces 72, 78 of the respective inner and outer endwalls 66, 68 may carry a plurality of profiled convex and concave regions 98, 100 configured to direct airflow C through the flowpath 84 while minimizing or eliminating unwanted air vortices.

The convex and concave regions 98, 100 are illustrated in FIG. 5 with topographic contour lines. Each convex region 98 may be located near and generally upstream of a respective leading edge 90 of the airfoils 64. Each concave region 100 may be circumferentially centered between and spaced from opposing pressure and suction sides 86, 88 of adjacent airfoils 64 and substantially centered axially between the leading and trailing edges 90, 92 (i.e. mid-chord). The convex regions 98 generally represent a projection of the respective surfaces 72, 78 into the flowpath 84 and the concave regions 100 generally represent a depression of the respective surface 72, 78 that extends away from the flowpath 84 (i.e. effectively enlarges the flowpath at the depressions).

Each convex region 98 gradually increases in height to a radial extent 102 positioned immediately adjacent to and axially upstream of the leading edge 90 of each airfoil 64. Each concave region 100 gradually increases in depth to a radial extent 104. The concave region 100 may extend axially along a significant percentage of the axial chord length 96 (see FIG. 3). The radial extent 104 of the concave region 100 may extend axially and by an axial distance that is within a range of about thirty to eighty percent of the axial chord length 96, and may extend circumferentially by a circumferential distance that is within a range of about thirty to seventy percent of the distance between opposing pressure and suction sides 86, 88 of adjacent airfoils 64 (i.e. pitch distance 94).

It is further understood and contemplated that the pitch-to-chord ratio taught in the present disclosure may apply to other stages in the turbine section 28 of the gas turbine engine 20. Furthermore, the pitch-to-chord ratio and/or the convex and concave regions 98, 100 taught in the present disclosure may apply to any vane and/or blade array in any stage of the turbine section 28 or the compressor section 24.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

What is claimed is:

1. A high pressure turbine of a gas turbine engine comprising:
    a first stage vane assembly comprising a first airfoil circumferentially spaced from an adjacent second airfoil and orientated about an engine axis, wherein the first airfoil has a leading edge and a trailing edge with the trailing edge configured to be circumferentially separated from the trailing edge of the second airfoil by a pitch distance, and the leading and trailing edges of the first airfoil are axially separated by an axial chord length, and wherein a pitch-to-chord ratio of pitch distance over axial chord length is equal to or greater than 1.7.

2. The high pressure turbine set forth in claim 1, wherein the first airfoil has a thickness-to-axial chord ratio that is greater than forty percent.

3. The high pressure turbine set forth in claim 2, wherein the thickness-to-axial chord ratio is about fifty-three percent.

4. The high pressure turbine set forth in claim 1, wherein the trailing edge has an angle that is greater than seventy-five degrees relative to the engine axis.

5. The high pressure turbine set forth in claim 4, wherein the pitch-to-chord ratio is within a range of about 1.7 to 2.0.

6. The high pressure turbine set forth in claim 1, wherein the pitch-to-chord ratio is within a range of about 1.7 to 2.0.

7. The high pressure turbine set forth in claim 1, wherein the pitch-to-chord ratio is about 1.8.

8. The high pressure turbine set forth in claim 1 further comprising:

an inner endwall, wherein the first airfoil projects radially outward from an outward surface of the inner endwall and the outward surface includes at least in-part a concave region located axially between the leading and trailing edges and circumferentially adjacent to the first airfoil.

9. The high pressure turbine set forth in claim 8, wherein the outward surface includes a convex region proximate to the leading edge of the first airfoil.

10. The high pressure turbine set forth in claim 1 further comprising:

an outer endwall, wherein the first airfoil projects radially inward from an inward surface of the outer endwall and the inward surface includes at least in-part a concave region located axially between the leading and trailing edges and circumferentially adjacent to the first airfoil.

11. The high pressure turbine set forth in claim 10, wherein the inward surface includes a convex region proximate to the leading edge of the first airfoil.

12. A gas turbine engine comprising:

a low pressure turbine; and a high pressure turbine upstream of the low pressure turbine with respect to a core airflow, the high pressure turbine comprising a vane array including a plurality of airfoils circumferentially spaced from one-another and orientated about an engine axis, wherein each one of the plurality of airfoils have a leading edge and a trailing edge with each one of the trailing edges being circumferentially separated by the next adjacent trailing edge by a pitch distance, and the leading and trailing edges of each one of the plurality of airfoils are axially separated by an axial chord length, and wherein a pitch-to-chord ratio of pitch distance over axial chord length is equal to or greater than 1.7.

* * * * *